July 15, 1969  R. D. ANDERSEN  3,456,152
ELECTRONIC CLOCK USING COUNTERS WITH DISPLAY INDICATOR
MEANS AND FAST RESET MEANS
Original Filed Feb. 3, 1960  5 Sheets-Sheet 1

INVENTOR.
Robert D. Andersen
BY
George R. Clark
atty.

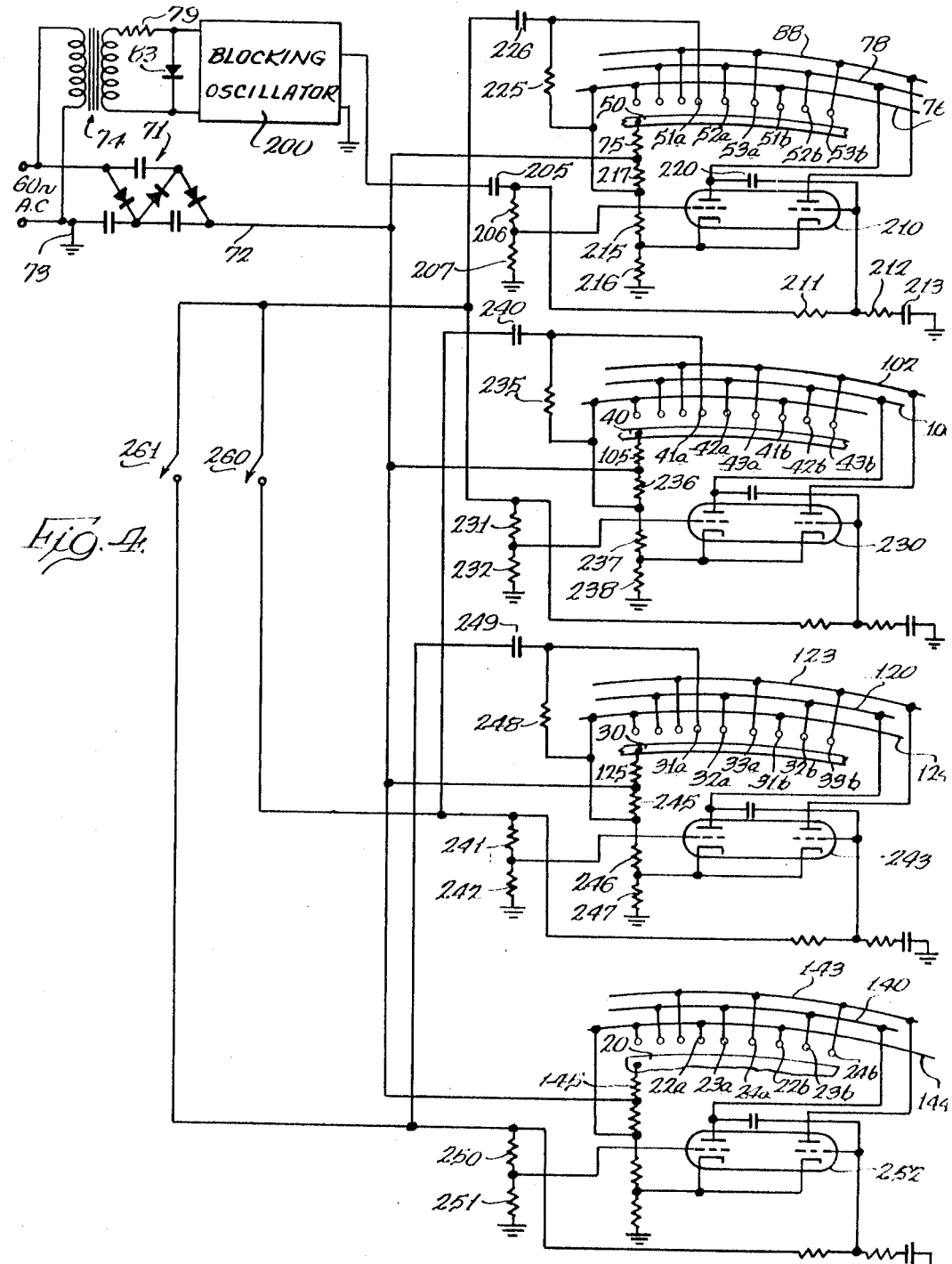

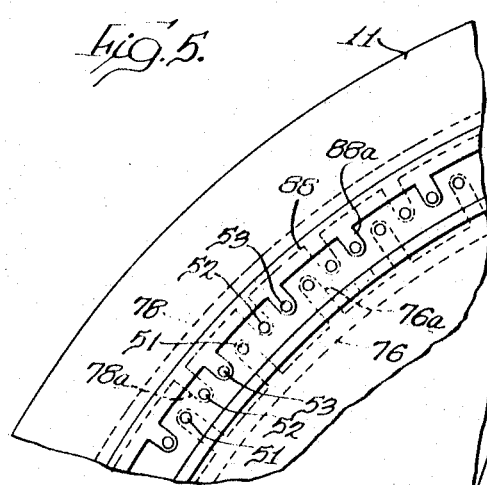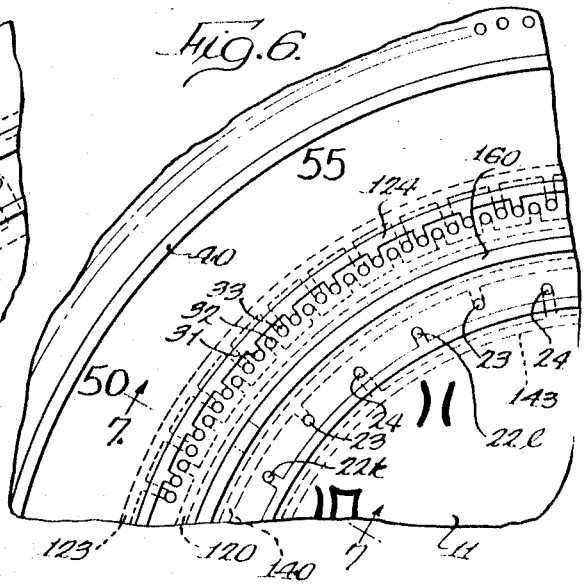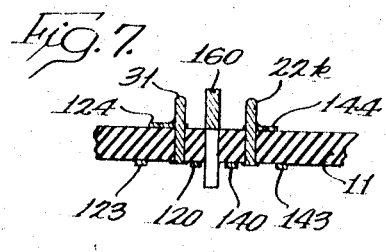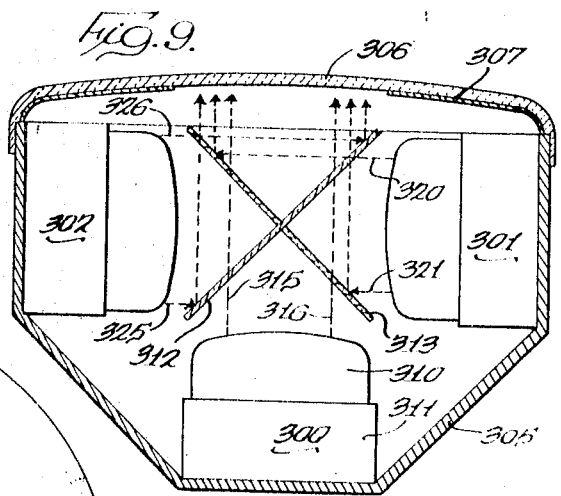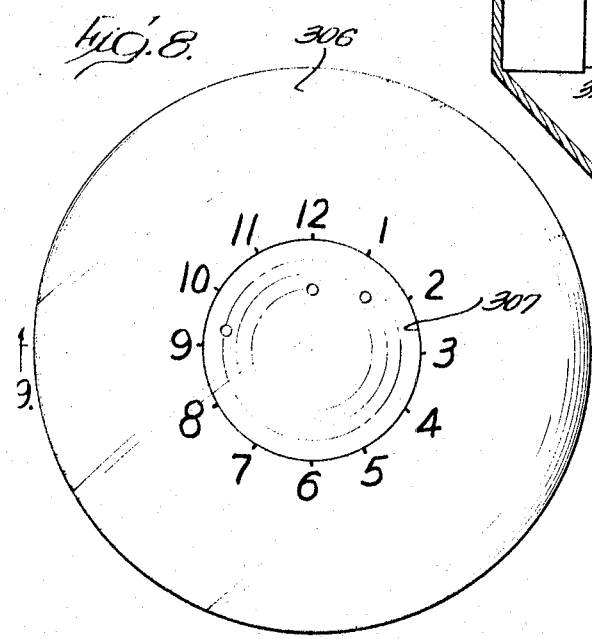

July 15, 1969

R. D. ANDERSEN 3,456,152

ELECTRONIC CLOCK USING COUNTERS WITH DISPLAY INDICATOR
MEANS AND FAST RESET MEANS

Original Filed Feb. 3, 1960

INVENTOR.
Robert D. Andersen
BY
George R. Clark
Atty.

United States Patent Office 3,456,152
Patented July 15, 1969

3,456,152
ELECTRONIC CLOCK USING COUNTERS WITH DISPLAY INDICATOR MEANS AND FAST RESET MEANS
Robert D. Andersen, West Covina, Calif., assignor to Sunbeam Corporation, Chicago, Ill., a corporation of Illinois
Continuation of application Ser. No. 6,465, Feb. 3, 1960. This application Jan. 18, 1966, Ser. No. 521,256
Int. Cl. H01j 17/36, 7/42; G04c 13/02
U.S. Cl. 315—84.6                                28 Claims

ABSTRACT OF THE DISCLOSURE

An electronic clock is constructed from a plurality of serially connected counters. The outputs of the counters are displayed on a cold cathode electric discharge tube of the sequence discharge type. The cold cathodes are arranged in concentric circular arrays to represent the hours, minutes and seconds by glowing spots or numerals. The counters can either be independent of the discharge tube, or the sequential properties of the discharge tube can be utilized so that the discharge tube also functions as a multiple section counter. To facilitate setting the electronic clock to the proper time, means are provided for channeling fast pulses to the minutes and the hours counters so that the minutes and hours counters can be rapidly set to the proper time. Pulses derived from a conventional 60 cycle per second source of power are applied to the input of the first counter, and serve as a frequency standard.

---

The present invention is a continuation of my copending application Ser. No. 6,465 filed Feb. 3,1960, now abandoned.

The present invention relates to clocks, and, more particularly, to an electronic clock which embodies no moving parts.

The electric clock has been used extensively for quite a number of years and where electric power is available has an advantage over the mechanical clock in that the moving parts are greatly reduced in number. However, the electric clock still has a large number of rotating parts including an electric motor and associated gear mechanism and the like. These moving parts are subject to wear, and, of course, require lubrication with the result that a device of this type has but a limited life in many cases. It would be desirable to provide an electric clock which embodies no moving parts and, hence, which has a substantially infinite life.

Accordingly, it is an object of the present invention to provide an electronic clock which embodies no moving parts and which is entirely accurate and dependable in operation.

It is a further object of the present invention to provide a new and improved electronic clock which may be energized directly from a conventional 60 cycle power line and is synchronized therefrom without requiring any mechanically moving parts.

Another object of the present invention resides in the provision of a new and improved electronic clock wherein the display on the face of the clock comprises spots of light representing the conventional hour, minute, and, if desired, second hands of a clock, these spots of light moving in correctly timed relationship to one another in concentrically positioned circular paths on the face of the clock.

Still another object of the present invention resides in the provision of a new and improved electronic clock wherein three spots of light are concurrently produced electronically on the face of the clock and are moved in correctly timed relationship to one another without employing mechanically moving parts.

A further object of the present invention resides in the provision of a new and improved electronic clock wherein electronic counting facilities are employed to develop timed electrical pulses corresponding to seconds, minutes and hours, these electronic counting facilities also being employed to provide a visual display from which the time of day can be readily determined.

It is another object of the present invention to provide a new and improved electronic clock wherein separate spots of illumination are caused to move in concentric circular paths at rates corresponding to hours and minutes of a conventional clock and wherein electronic facilities are proved for causing said spots to move in said circular paths at relatively rapid rates so that the spots may be quickly set to desired hour and minute indications.

Further objects and advantages of the present invention will become apparent as the following description proceeds and the features of novelty which characterize the invention will be pointed out with particularity in the claims annexed to and forming a part of this specification.

Briefly, in accordance with one aspect of the present invention, there is provided a gas filled housing within which there is positioned a series of three electronic counters which function not only to establish the correct time by electronic counting with reference to the 60 cycle current supplied to the clock but also function as a visual display device, similar in some respects to a conventional clock, from which the time of day may be readily determined. These electronic counters comprise, respectively, first, second and third rings of glow cathodes, these rings being arranged concentrically and preferably with the smallest ring of twelve glow cathodes representing hours, the next larger ring of sixty glow cathodes representing minutes and the largest diameter ring of sixty glow cathodes representing seconds. Guide or transfer electrodes are positioned between the individual glow cathodes in each ring and electrical pulses which are derived from the conventional 60 cycle alternating current supply are impressed upon the guide electrodes of the seconds counter which includes the outermost ring of sixty glow cathodes at the rate of one pulse every second. The seconds counters respond to these pulses by advancing one step for each pulse with the result that the individual glow cathodes in the outermost ring are caused to glow in succession and a spot of illumination moves in stepwise fashion and in a clockwise direction around the outermost ring at the rate of one step per second. Each time the seconds counter has been stepped through one complete cycle, control pulses which recur at the rate of one pulse every minute are derived from one of the glow cathodes in the outermost ring and these control pulses are then applied to the transfer electrodes of the minutes counter so that the glow cathodes in the intermediate ring are sequentially energized and a corresponding glow or spot of illumination moves from one glow cathode to another in this ring in stepwise fashion and at the rate of one complete revolution per hour. Control pulses are likewise derived from one of the glow cathodes in the middle ring, these control pulses occurring at the rate of one pulse each hour, and these hour control pulses are supplied to the transfer electrodes of the hours counter so that the glow cathodes in this ring are sequentially energized at the rate of one glow cathode per hour and the resulting spot of illumination moves in stepwise fashion about the innermost ring at the rate of one revolution every twelve hours. All of the glow cathodes in the three rings are viewable through a transparent opening in the face of the gas filled housing so that the above described spots of illumination may be simultaneously viewed and the time of day readily determined.

In accordance with a further phase of the present invention, a fourth electronic counter is provided within the housing which includes a fourth ring of glow cathodes concentric with the above described three rings, this fourth ring of glow cathodes and its associated transfer electrodes being, however, hidden from view by a suitable masking arrangement. This fourth electronic counter functions solely as a counter to divide the sixty cycle per second power current by a factor of sixty so as to provide the above described control pulses for the seconds counter. Accordingly, the sixty cycle per second alternating current supply voltage may be directly applied to this fourth electronic counter and control pulses derived therefrom which recur at the rate of one pulse every second. With this arrangement all of the electronic counting facilities which are required to count down from the sixty cycle per second rate of the supply voltage to the slowest rate of one pulse per hour are completely contained within the housing of the display device so that an extremely compact and simplified electronic clock is provided.

In accordance with still another phase of the present invention, there is provided electronic facilities for setting the hour and minute spots of illumination to desired hour and minute indications around the respective inner and middle rings. Specifically, control pulses which recur at the rate of one pulse each second may be selectively applied through a suitable switching arrangement to both the hours and minutes counters so that these counters are stepped at an abnormally rapid rate. As these counters are stepped at this rapid rate the glow discharges on the respective glow cathodes provide an indication of the setting of each counter so that the desired hour and minute indications may be readily established after which the counters are switched back to their normal rates and continue thereafter to give the correct time indication.

In accordance with a further phase of the present invention, three separate electronic counting tubes, each having the required number of glow cathodes and transfer electrodes, are so arranged that the spots of illumination produced by the respective tubes may be superimposed on a common viewing screen in such manner that they rotate in concentric circular paths at the desired rates. With this arrangement each counting array is contained in a separate gas filled envelope, the combination of the three spots of illumination being provided optically by means of suitably placed one-way transmission mirrors.

In accordance with a still further phase of the invention, a plurality of separate electronic counters or scalers may be employed to develop the necessary rings, these electronic counters being preferably contained in the same housing as the display rings, so as to provide a compact, self-contained device. With this arrangement, the accuracy of control is not dependent on the functioning of the display rings. Also, a fourth counting ring is not required to produce the necessary control pulses for the display rings. Preferably, these separate electronic counters employ magnetic cores and transistor circuitry so as to reduce the weight, size and power consumption thereof and to facilitate inclusion thereof within the case of the electronic clock.

For a better understanding of the present invention reference may be had to the accompanying drawings in which:

FIG. 4 is an electrical schematic diagram of an alternative circuit arrangement for the device of FIG. 1;

FIG. 5 is a fragmentary plan view of an alternative embodiment of the invention wherein a printed circuit arrangement is employed for the glow cathode and transfer electrode arrangement in the device of FIG. 1;

FIG. 6 is a fragmentary plan view of an alternative printed circuit arrangement wherein a common anode is employed for both the hours and minutes rings of glow cathodes;

FIG. 7 is a sectional view taken along the line 7—7 of FIG. 6;

FIG. 8 is a plan view of an alternative electronic clock embodying the principles of the present invention wherein the hours, minutes and seconds electronic counting and display arrangements are contained in separate envelopes;

FIG. 9 is a sectional view taken along the lines 9—9 of FIG. 8; and

Figure 1:
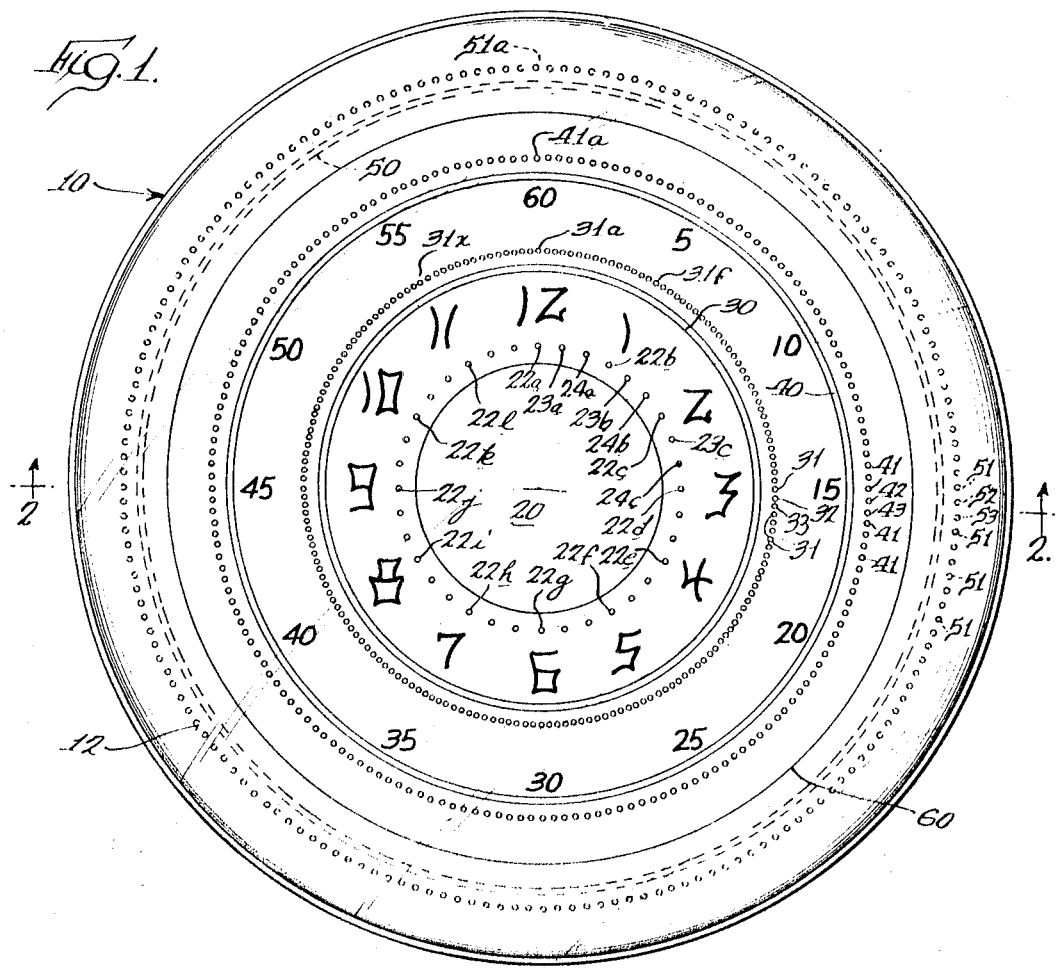
FIG. 1 is a plan view of an electronic clock embodying the principles of the present invention.
Figure 2:
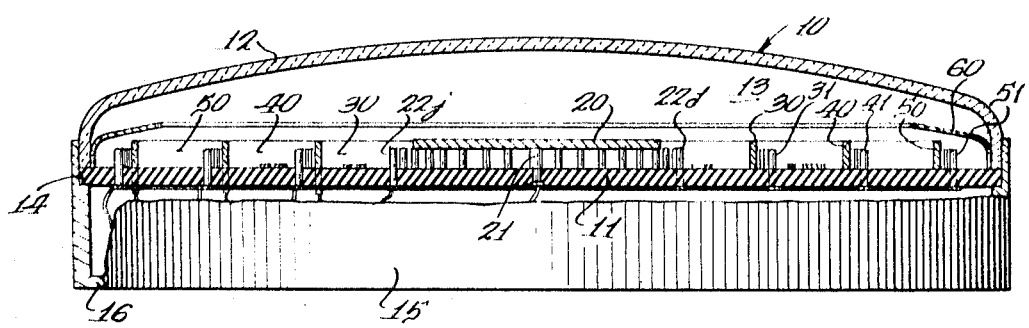
FIG. 2 is a sectional view taken along the lines 2—2 of FIG. 1.

Referring now to the drawings and more particularly to FIGS. 1 and 2 thereof, the electronic clock of the present invention is therein illustrated as comprising a housing indicated generally at 10 which includes a circular base or support member 11 and a transparent cover member 12, a suitable airtight seal being provided between the members 11 and 12 so that the space 13 within the housing 10 may be filled with gas at suitable low pressure in the manner of the conventional cold cathode electric discharge tubes of the so-called sequence discharge type. The base member 11 is made of insulating material and supports the cathodes, transfer electrodes and anode of four electronic counters which commonly utilize the gas filled space 13 to provide independently controllable cathodic glow discharges. As will be described in more detail hereinafter, the base member 11 is supported on a ledge 14 formed in the inner edge of a bottom closure member 15, the space between the base 11 and the bottom wall 16 of the closure member 15 being preferably employed to house the electronic circuitry of the clock, as will be described in more detail hereinafter.

In the central portion of the base member 11 there is provided an hour's combination counting and display arrangement which comprises a central anode 20 in the form of a circular disc, which is spaced from the upper surface of the base member 11 by means of a supporting stem 21, and a series of twelve glow cathodes 22, identified individually by the reference characters 22a to 22l, these glow cathodes being positioned at equally spaced intervals in an annular path of slightly larger diameter than the anode 20 with the upper ends of the glow cathodes 22 being positioned adjacent the outer edge of the disc anode 20. A pair of guide cathodes, or transfer electrodes, 23 and 24 are interposed between each of the glow cathodes 22 in the ring, each pair of the transfer electrodes 23 and 24 being identified by the same reference letter as the preceding glow cathode in the ring.

The glow cathodes 22 are spaced apart by thirty degree intervals and in order to facilitate identification of a particular one of these glow cathodes with a particular hour indication suitable indicia are positioned on the base member 11, these indicia being spaced outwardly from the ring of glow cathodes 22. Thus, the number "twelve" is positioned adjacent the topmost glow cathode 22a, the number "one" is positioned adjacent the next glow cathode 22b, etc.

The minutes combination counting and display arrangement is positioned concentrically with the above described hours counting array and includes a common anode member 30 in the form of a circular band and a series of sixty glow cathodes 31 which are spaced in an annular path of slightly larger diameter than the circular anode 30. A pair of guide or transfer electrodes 32 and 33 are provided for each one of the glow cathodes 31, these transfer electrodes 32, 33 being positioned between each successive pair of glow cathodes 31. The glow cathodes 31 are positioned at six degree intervals and suitable indicia are provided to facilitate identification of particular glow cathodes with particular minute indications. Thus, the indicia "sixty" is spaced radially outwardly from the top glow cathode 31a, the indicia "five" is positioned on the base member 11 spaced radially outwardly from the fifth glow cathode 31f, etc. It will be understood that all of the glow cathodes 31 and guide or transfer electrodes 32 and 33 are in the form of small pins which are supported on the base member 11 and extend upwardly therefrom so that the ends thereof are positioned in the region adjacent the upper edge of the anode band 30.

In the embodiment shown in FIGS. 1 and 2 a third combination counting and display arrangement is provided so that a spot of illumination corresponding to the conventional second hand is produced. More particularly, this third array comprises a common anode 40 in the form of a circular band, and a series of sixty glow cathodes 41 which are spaced in an annular path of slightly larger diameter than the anode 40. A pair of guide cathodes or transfer electrodes 42 and 43 are positioned between each pair of glow cathodes 41. The indicia which are spaced radially outwardly from the minutes glow cathodes 31, such as the indicia sixty above the glow cathode 31a, may also be employed to identify particular ones of the seconds glow cathodes 41 with reference to particular second intervals such for example as cathode 41a. In the alternative, another set of indicia may be spaced radially outwardly from the glow cathodes 41 so as to facilitate identification of a particular glow cathode with a particular second indication. The glow cathodes 41 which represent individual seconds are arranged to be sequentially energized at the rate of one glow cathode for each second.

In order to produce suitable control pulses which may supplied to the transfer electrodes 42, 43 to effect energization of the glow cathodes 41 at the desired second intervals, it is necessary to reduce the frequency of the conventional 60 cycle alternating current by a factor of sixty. To this end, a fourth counting tube arrangement is provided, this fourth arrangement including a common anode 50 in the form of a circular band and a series of sixty glow cathodes 51 which are equally spaced in an annular path slightly larger than the diameter of the anode 50. A pair of guide electrodes 52 and 53 are positioned adjacent each of the glow cathodes 51 to effect transfer of the glow discharge from one glow cathode to another, as will be described in more detail hereinafter. This fourth counting arrangement is arranged to be energized directly from the sixty cycle alternating current supply so that the glow cathodes 51 are energized at the rate of one glow cathode every sixtieth of a second. Accordingly, the complete set of sixty glow cathodes 51 is sequentially energized in one second. Since visual time determination to a fraction of a second is not normally required the fourth counting arrangement is masked from view by means of an opaque shielding member 60 which is positioned within the housing 10 and extends inwardly beyond the common anode 50 of the fourth counting arrangement. However, it will be understood that if an extremely accurate counting arrangement is required wherein time to a fraction of a second is to be indicated the mask 60 may be omitted with the result that the sequential glow discharges on the glow cathodes 51 will be visible through the cover member 12.

Figure 3:
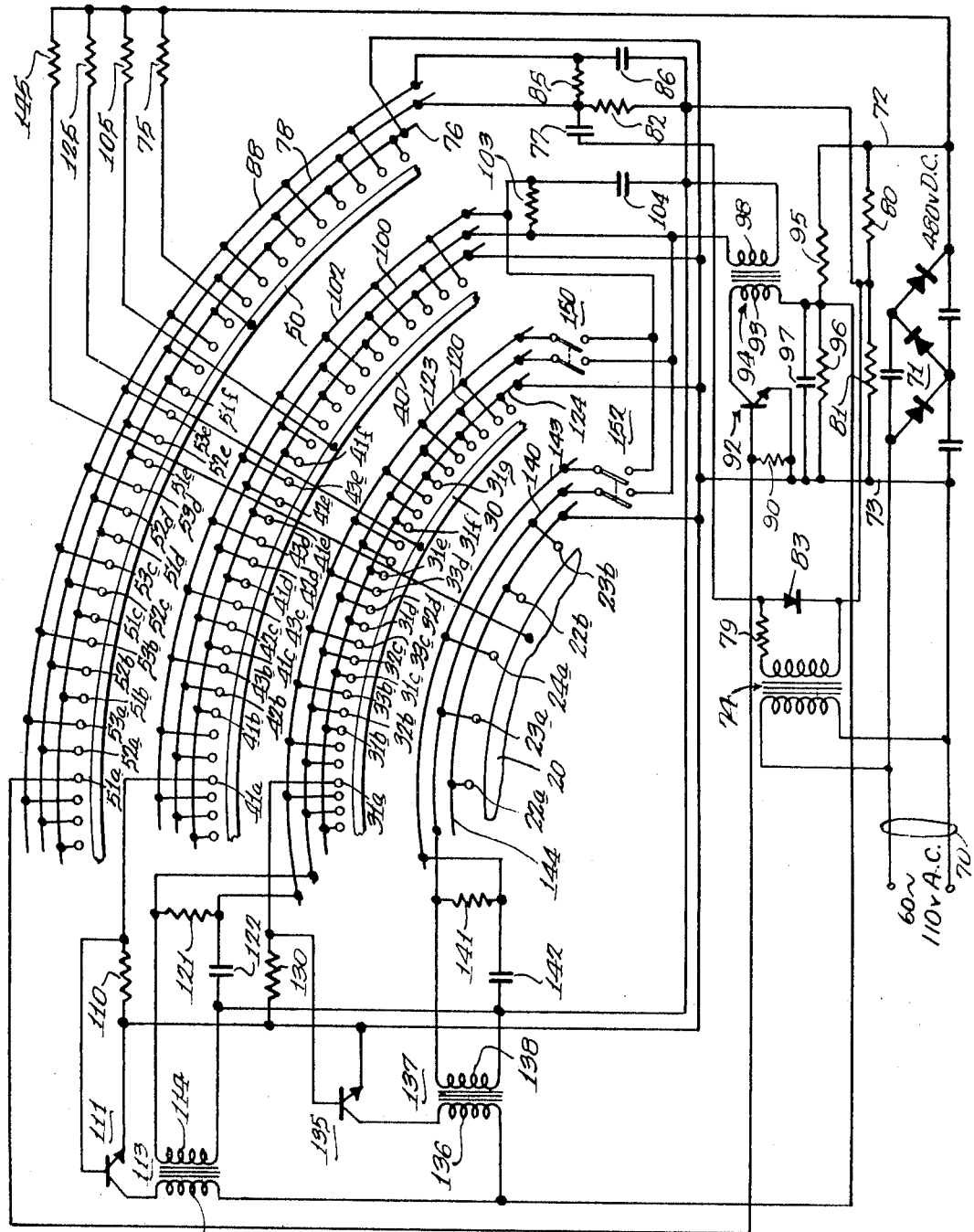
FIG. 3 is an electrical schematic diagram of the circuit components of the device of FIG. 1.

Considering now the circuitry of the electronic clock of the present invention whereby the above described electronic counters may be sequentially energized in the manner described heretofore, in FIG. 3 of the drawings there is shown a schematic diagram of an extremely simple electronic circuit for energizing all four electronic counters in the desired sequential manner. Referring to this figure, a segment of each of the four electronic counters of FIG. 1 is illustrated therein together with the electronic circuits necessary to energize these counters, it being understood that these circuits are preferably positioned between the base member 11 and closure 15 so that a compact unitary device is provided. The electronic clock is arranged to be connected to a conventional sixty cycle alternating current supply through the power cord 70 and in the illustrated embodiment of FIG. 3 a transformerless voltage tripler arrangement, indicated generally at 71, is employed to develop a unidirectional voltage of approximately 480 volts D.C. between the positive conductor 72 and the negative conductor 73 of the voltage tripler power supply.

Considering first the outermost ring of glow cathodes 51, which in the embodiment of FIGS. 1 and 2 is masked by the shield 60, the common anode 50 associated with this outermost ring of glow cathodes is connected to the B+ conductor 73 through an anode resistor 75. All of the glow cathodes 51 except the glow cathode 51a which is at the twelve o'clock position in FIG. 1, are connected to a common glow cathode bus 76 which is in turn connected to the negative or ground conductor 73 of the voltage tripler power supply 71. The sixty cycle alternating current supply is also employed to provide a triggering signal so that the glow cathodes 51 in the outermost ring are sequentially energized at the rate of one glow cathode every sixtieth of a second, it being understood that the frequency of the conventional alternating current supply is held very accurately to sixty cycles per second at the power plant and hence the alternating current supply may serve as an accurate source of control pulses for the electronic clock. More particularly, the power cord 70 is connected to a saturating transformer 74 and a resistor 79 and diode 83 are connected in series across the secondary of the transformer 74. In the transformer 74 the sinusoidal alternating current wave is changed to a sharply peaked wave, due to the saturation characteristics of the transformer 74, and the rectifier 83 suppresses the positive peaks of this waveform so that sharp negative pulses occuring at the rate of one pulse every sixtieth of a second are produced across the rectifier 83. These negative pulses are coupled through a condenser 77 to a first common transfer bus 78 to which all of the first guide or transfer electrodes 52 in the outermost ring are connected. The first common transfer bus 78 is also biased positively with respect to the glow cathodes 51 by means of a voltage divider comprising the resistors 80 and 81 which are connected between the power supply conductors 72 and 73 so as to provide a positive voltage at the junction of the resistors 80 and 81. This positive bias voltage is then supplied through a resistor 82 to the first common transfer bus 78. If desired, the voltage tripler power supply 71 may be employed not only to provide the necessary high voltage for the glow discharge rings without the use of transformers but, in addition, may be used as a source of control pulses since the voltage tripler power supply 71 develops a ripple voltage which has a pronounced sixty cycle component in the form of a generally negatively going pulse. In such case the transformer 74 and its associated circuitry are not required and the required triggering signal may be supplied to the transfer bus 78 through a small condenser, as will be readily understood by those skilled in the art. However, the arrangement shown in FIG. 3 wherein the triggering signal is obtained directly from the alternating current supply, has the advantage that the triggering signal does not vary with changes in load as would the sixty cycle ripple component.

The control pulses supplied to the bus 78 are supplied through a time delay network, in the form of a simple integration circuit comprising a series resistor 85 and a shunt condenser 86, to a second common transfer bus 88 to which all of the second guide or transfer electrodes 53 in the outermost ring are connected. The bus 88 also receives the positive bias developed at the junction of the resistors 80 and 81 through the resistors 82 and 85 so that all of the transfer electrodes 52 and 53 are normally biased positively with respect to the glow cathodes 51.

Assuming that a glow discharge is present on the glow cathode 51b (FIG. 3), when a negative pulse is supplied to the transfer bus 78 from the rectifier 83, all of the transfer electrodes 52 are driven negative by an amount sufficient to cause the glow discharge to move to that one of the transfer electrodes 52 which is closest to the glow cathode 51b, i.e., the transfer electrode 52b. In this connection it will be understood that the glow discharge does not move in the counterclockwise direction to the adjacent guide electrode 53a because this electrode remains positively biased, the negative control pulse not having yet reached the transfer bus 88 through the delay network 85, 86.

The glow discharge remains on the guide electrode 52b for the duration of the negative control pulse. However, at the end of this control pulse the voltage on the transfer electrode 52b becomes positive again and the glow discharge will jump back to the glow cathode 51b unless the second transfer electrode 53b on the other side of the transfer electrode 52b has by this time become more negative than the glow cathode 51b. To this end, the time constant of integration network 85, 86 is so chosen that the second transfer bus 88, to which all of the second transfer electrodes 53 are connected, becomes negative with respect to ground before the first transfer bus 78 becomes positive with respect to ground at substantially the end of the negative control pulse. With such a time constant the glow discharge is then forced to move on to the second transfer electrode 53b rather than to return to the glow cathode 51b.

The glow discharge remains on the second transfer electrode 53b until the end of the delayed control pulse applied to the transfer bus 88 through the integration network 85, 86. However, when the transfer bus 88 again becomes positive with respect to ground the glow discharge again moves in the clockwise direction to the next adjacent one of the glow cathodes 51, i.e., the glow cathode 51c. The glow discharge moves in this direction rather than back to the first transfer electrode 52b for the reason that by the time the transfer bus 88 becomes positive with respect to ground the transfer bus 78, and hence the transfer electrode 52b which is connected thereto, is biased positively to the full bias level and hence the glow discharge prefers to move to the glow cathode 51c which is connected to ground rather than to the positively biased transfer electrode 52b.

It will thus be evident that for each negative control pulse the glow discharge is moved from one to another of the glow cathodes 51 in a clockwise direction. It will also be noted that the movement of the glow discharge is in a stepwise fashion since the movement of the glow discharge from one glow cathode to another is achieved by virtue of the sequential pulses applied to the intervening transfer electrodes 52 and 53.

In order to provide a pulse type control signal for the seconds glow discharge ring which is immediately inside the above described outermost ring, the glow cathode 51a in the outermost ring, which is positioned at the twelve o'clock position in this ring, is not connected to the common glow cathode bus 76, but instead is connected through a resistor 90 to the negative or ground conductor 73 of the power supply 71. Accordingly, each time the glow cathode 51a is energized and a glow discharge is produced thereon, a positive going pulse type signal is produced across the resistor 90, this pulse signal having a duration equal to the interval during which a glow discharge is produced on the glow cathode 51a. The pulse signal produced across the resistor 90 is applied to the base electrode of a transistor amplifier indicated generally at 92, the collector of this transistor being connected through the primary winding 93 of a coupling transformer 94 to a relatively low amplitude D.C. voltage which is produced by the voltage divider 95, 96 connected across the output of the power supply 71. Preferably, the voltage produced at the junction of the resistors 95, 96 is of the order of 22 volts D.C. and a filter condenser 97 is connected across the lower resistor 96 of this voltage divider so as to provide an essentially unidirectional supply voltage for the collector of the transistor 92.

The emitter of the transistor 92 is connected to ground and in the illustrated embodiment this transistor is of the npn type. Accordingly, the transistor 92 is normally cut off since both the base and emitter of this transistor are connected to ground. However, when a positive pulse appears across the resistor 90, due to a glow discharge at the glow cathode 51a, the base of the transistor 92 is driven positively so that a corresponding pulse of current flows through the primary winding 93 of the transformer 94. A corresponding negative going pulse is thus produced across the secondary winding 98 of the transformer 94, this negative pulse occurring once for each complete traversal of the glow cathodes 51 in the outermost ring, i.e., at a rate of one pulse per second.

The seconds glow discharge ring is controlled in a manner similar to that described above in connection with the outermost ring from the pulses developed across the secondary winding 98 of the transformer 94. Thus, all of the glow cathodes 41 in the seconds glow discharge ring are connected to ground except for the glow cathode 41a which is positioned at the twelve o'clock position of this ring. In a similar manner all of the first guide or transfer electrodes 42 are connected to a first common seconds transfer bus 100 and all of the second guide or transfer electrodes 43 are connected to a second common seconds transfer bus 102. The negative pulses produced across the secondary winding 98 in the manner described above are applied directly to the first seconds transfer bus 100 and are also applied through a time delay network including the series resistor 103 and the shunt condenser 104 to the second seconds transfer bus 102. The negative pulse applied to the transfer bus 100 is effective to shift the glow discharge from one of the glow cathodes 41 to the next adjacent one of the transfer electrodes 42 and the negative pulse applied to the transfer bus 102 is effective to shift the glow discharge from this one of the transfer electrodes 42 to the next adjacent one of the transfer electrodes 43. At the end of the negative pulse applied to the transfer bus 102 the glow discharge is shifted in a clockwise direction to the next adjacent one of the glow cathodes 41 and remains on this glow cathode until the next set of negative pulses are applied to the transfer buses 100 and 102 in sequence. Accordingly, the glow discharge on one of the glow cathodes, such as the glow cathode 41b, is shifted to the next adjacent transfer electrode 42b in response to the first negative pulse applied to the transfer bus 100 and is shifted to the next adjacent transfer electrode 43b in response to the negative pulse applied to the transfer bus 102. When the negative pulse applied to the bus 102 disappears the glow discharge then moves onwardly to the next adjacent glow cathode 41c in preference to the transfer electrode 42b since the transfer electrode 42b is positively biased, it being noted that the secondary winding 98 of the transformer 94 is not connected to ground but instead is connected to the junction of the resistors 80 and 81 so that the same positive bias is applied through the transfer buses 100 and 102 to all of the transfer electrodes in the seconds glow discharge ring in a manner similar to that described above in connection with the outermost ring. It will therefore be evident that a glow discharge moves in stepwise fashion from one to another of the glow cathodes 41 and at the rate of one complete traversal of all of these electrodes each minute.

The glow cathode 41a is not connected directly to ground but instead is connected through an output resistor 110 to ground. Accordingly, a negative pulse is produced across the resistor 110 each time the glow cathode 41a is energized, this pulse having a duration of approximately one second and occurring at the rate of one pulse every minute. The negative pulses thus produced across the resistor 110 at the rate of one pulse every minute are employed as control pulses for the minutes glow discharge ring including the glow cathodes 31. To this end the glow cathode 41a is connected to the base electrode of a transistor amplifier 111, the emitter of this transistor being connected to ground and the collector thereof being connected through a primary winding 112 of a coupling transformed 113 to the twenty two volt supply voltage produced across the resistor 96. The transistor 111 functions in a manner similar to that described above in connection with the transistor 92 to produce negative pulses across the secondary winding 114 of the transformer 113, these pulses, however, occurring at the rate of one pulse every minute.

The negative pulses produced across the winding 114 are coupled directly to the first common minutes bus 120 and are also supplied through an integrating network including the resistor 121 and the condenser 122 to a second common minutes transfer bus 123. All of the first transfer electrodes 32 are connected to the first minutes transfer bus 120 and all of the second transfer electrodes 33 are connected to the second minutes transfer bus 123. All of the glow cathodes 31, except the glow cathode 31a which is positioned at the twelve o'clock position, are connected to a common bus 124 which is in turn connected to ground and the common anode 30 of the minutes glow discharge ring is connected to the conductor 72 through a resistor 125. The negative pulses from the transformer 113 are thus sequentially applied to the transfer buses 120 and 123 and function to shift the glow discharge from one to another of the glow cathodes 31 in a manner similar to that described above in connection with the seconds glow cathode ring and the outermost ring. However, since the control pulses applied to the buses 120 and 123 recur at the rate of one pair of pulses each minute, the glow discharge moves about the minutes glow discharge ring in a stepwise fashion at the rate of one step every minute so that one hour is required for a complete traversal of all of the glow cathodes in this ring. Since the control pulses applied to the buses 120 and 123 have a duration of one second the glow discharge produced at any one of the glow cathodes 31 persists for approximately fifty-nine sixtieths of a minute, as will be evident from the above description in connection with the seconds glow discharge ring. Accordingly, each of the glow cathodes in the minutes glow discharge ring is energized for approximately one minute.

The glow cathode 31a in the minutes ring is connected to ground through an output resistor 130 so that negative pulses are produced across this resistor, these negative pulses having a duration of approximately one minute and recurring at the rate of one pulse every hour. The negative pulses thus produced across this resistor are employed as control pulses for the innermost hours glow discharge ring which includes the glow cathodes 22. More particularly, the negative pulses produced across the resistor 130 are applied to the base electrode of a transistor amplifier 135, the emitter of this transistor being connected to ground and the collector thereof being connected thruogh the primary winding 136 of a transformer 137 to the supply voltage produced across the resistor 96. Accordingly, there is produced across the secondary winding 138 of the transformer 137 control pulses which are impressed directly upon a first hours transfer bus 140 and are also supplied through a time delay network including the resistor 141 and the condenser 142 to a second hours transfer bus 143. All of the first transfer electrodes 23 in the hours ring are connected to the first transfer bus 140 and all of the second transfer electrodes 24 in the hours ring are connected to the transfer bus 143. All of the glow cathodes 22 are connected through a common bus 144 to ground and the common central anode 20 of the hours ring is connected to the B+ conductor 72 through a resistor 145.

The negative pulses thus sequentially applied to the transfer buses 140 and 141 at the rate of one pair of pulses each hour are thus effective to shift the glow discharge from one to another of the glow cathodes 22. As a result, the glow discharge moves from the glow cathode 22a, for example, to the transfer electrode 23a in response to a control pulse impressed upon the transfer bus 140 and then moves on to the next transfer electrode 24a as this control pulse is applied to the transfer bus 143. At the end of the pulse applied to the transfer bus 143 the glow discharge moves on to the next glow cathode 22b and remains at this cathode for a period of approximately one hour, at which time the next control pulse is sequentially applied to the transfer buses 140 and 143 so that the glow discharge is shifted to the next glow cathode 22c, etc. Accordingly, the glow discharge moves in stepwise fashion around the hours glow discharge ring at the rate of one step each hour, it requiring a period of twelve hours for a complete traversal of all of the glow cathodes 22.

From the foregoing description of the four concentric glow discharge rings contained within the housing 10, it will be evident that glow discharges or spots of illumination are concurrently produced on each of these rings, these spots of illumination moving in stepwise fashion about each ring in timed relation to one another so that the time of day may be quickly and accurately determined by reference to the hours ring, the minutes ring and the seconds ring. In this connection it will be noted that the glow discharge does not move in a smooth or continuous manner about each ring but rather moves in a discontinuous or stepwise fashion. This is particularly noticeable on the innermost hours ring in which the glow discharge remains at one of the glow cathodes 22 for almost the full hour and then is rapidly transferred to the next glow cathode at the start of the next hour. This has the advantage that the time of day may be accurately determined without interpolation between the hour indicia whereas in the conventional mechanical clock in which the hour hand moves continuously interpolation between the adjacent hour indicia is required to determine the time of day. For example, if the time of day is 5:55 a glow discharge would be produced on the fifth hours glow cathode 22f and a glow discharge would also be produced on the minutes glow cathode 31x whereas with a conventional mechanical clock the hour hand would be very close to the numeral 6.

In order to change the timing relationship between the glow discharges produced on the concentric glow discharge rings so that the position of these glow discharges may be set or changed in accordance with a desired hours and minutes indication, there is provided, in accordance with an important feature of the invention, facilities for supplying the control pulses which are produced across the transformer winding 98 at the rate of one pulse every second to either one of the minutes and hour rings so that the glow discharges normally produced on these rings may be caused to move at the abnormally high rate of one step every second, thereby permitting the desired setting of hour and minute indications, More particularly, a double pole single throw minutes set switch indicated generally at 150 is provided to connect the seconds transfer bus 100 to the minutes transfer bus 120 and to connect the seconds transfer bus 102 to the minutes transfer bus 123. Preferably the switch 150 is in the form of a push button switch and when this switch is depressed the contacts thereof are closed so that the control pulses normally supplied to the seconds glow discharge ring are also supplied through the switch 150 to the minutes glow discharge ring. Accordingly, the glow discharge produced on the glow cathodes 31 is stepped sequentially in clockwise fashion around this ring at the rate of one step every second and will continue to be stepped at this abnormally fast rate as long as the switch 150 is closed. The switch 150 is therefor depressed only long enough to step the glow discharge around the minutes ring to the desired glow cathode at which time the switch 150 is opened and the minutes glow cathodes 31 are thereafter sequentially energized at the normal rate of one glow cathode each minute.

In a similar manner a double pole single throw hours set switch 152 is provided to connect the second transfer buses 100 and 102, to the respective hours buses 140 and 143. The switch 152 is also preferably of the push button type and when it is closed the control pulses normally applied to the buses 100 and 102 are also connected to the hours buses 140 and 143 so that the glow cathodes 22 are sequentially energized at the abnormally high rate of one every second. Accordingly, the switch 152 is closed only for the number of seconds required to step the glow discharge to the desired one of the glow cathodes 22, after which the switch 152 is opened and the sequential energization of the glow cathodes 22 thereafter proceeds at the normal rate of one glow cathode every hour. In this connection it will be noted that the control pulses normally applied from the transformer 113 to the minutes glow discharge ring and the pulses normally applied from the transformer 137 to the ring are not disconnected during the minutes and hours setting operations since these pulses merely function to add an additional pulse during the setting operation if a particular minute or hours control pulse occurs during the setting operation. However, it will be understood that these normally applied pulses may, if desired, be disconnected from their respective buses by means of additional contacts on the switches 150 and 152 if interference from these transformer derived pulses is objectionable.

In FIGS. 1 and 2 the glow cathodes and transfer electrodes in each of the rings have all been illustrated as being in the form of short pins which are secured in the base 11 by any suitable means. These pins may be fabricated as in the normal manufacture of cold cathode counting tubes of the sequence discharge type and connection of these pins to the respective buses described in connection with FIG. 3 may be made in any suitable manner. For example, these pins may be provided with head portions to which wires may be attached on the reverse or bottom side of the base 11 so that all of the required connections to the glow cathodes and first and second transfer electrodes in each ring can be made. In this connection it will be understood that all of the pin type glow cathodes and guide electrodes are of such diameter and spacing and the respective glow discharge rings are of such diameter that the necessary glow discharge between the adjacent portion of the common anode and the desired glow cathode or transfer electrode can be effected. Preferably the spacing between these pins and between the pins and the associated anode is of the order of the spacing conventionally employed in cold cathode counting tubes of the sequence discharge type. However, it will be understood that since the hours ring requires only thirty-six pins whereas the minutes and seconds ring require one hundred and eighty pins, the spacing between the pins in the hours ring is preferably made as large as possible commensurate with good glow discharge qualities whereas the spacing in the minutes and second rings, particularly the minutes ring, is made as small as possible commensurate with the above described sequential energization of the glow cathodes.

It is also pointed out that in the hours ring the glow cathodes 22 may either be in the form of pins as illustrated in FIGS. 1 and 2 or may themselves comprise wire forms in the shape of the desired numerals, an electrical connection being established to these wire forms so as to provide a glow discharge at the glow cathode in the form of a numeral. In the alternative, a silk screen type of printed conductive material, normally provided on a ceramic base, may be employed as the hour glow cathodes, it being understood that the common anode 20 would then be appropriately shaped to provide the desired visible glow discharge on each of the numerically shaped glow cathodes in the hours ring.

In the embodiment of FIGS. 1 and 2, the common anode of each ring except the hours ring is shown as comprising a circular band which is mounted on edge on the base 11 and secured, for example, by studs through the base 11. Electrical connection to each anode can conveniently be made to one of these supporting studs on the bottom side of the base 11. In a similar manner connection to the central anode 12 is conveniently made to the portion of the stem 21 which is accessible from the bottom of the base 11. In this connection it will be understood that any suitable means may be employed to evacuate the space 13 within the housing 10 and for filling the space 13 with a suitable gas, such as neon at a suitable low pressure, in the manner of the conventional gas filling of cold cathode counting tubes of the sequence discharge type.

In the embodiment of FIGS. 1 to 3, inclusive, an arrangement has been shown wherein two guide or transfer electrodes are positioned between each glow cathode so as to effect glow discharge transfer between these glow cathodes. With an arrangement employing two transfer electrodes for each glow cathode the direction of transfer may be reversed in the manner of the conventional glow cathode sequence discharge tube. However, in the electronic clock of the present invention the transfer of the glow discharges from one glow cathode to another can always be in the same direction since the clock is reset by stepping up the rate of transfer rather than by reversing the direction thereof. Accordingly, in certain instances it may be desirable to provide as small an electronic clock as possible in which case one set of transfer electrodes may be eliminated. With such an arrangement the remaining set of transfer electrodes are so shaped and positioned relative to the anode as to favor glow discharge transfer in a particular direction, as will be readily understood by those skilled in the art. As an alternative arrangement, a suitable magnetic field may be established within the housing by any suitable means so as to cause the transfer of glow discharge in a predetermined direction. Such an arrangement could be accomplished by the same general arrangement as employed in conventional beam switching tubes.

Connection may also be made to the pin type glow cathodes and transfer electrodes by means of the alternative arrangement shown in FIG. 5 wherein a portion of the outermost counting ring is illustrated. Referring to this figure, the base member 11 in this embodiment is preferably made of a suitable ceramic material and the interconnecting buses between the various pins are in the form of printed circuit connections such as silver printed on a ceramic base or other metallic material which is suitably etched in accordance with conventional printed circuit techniques. Since there are three main buses associated with each ring, one of these buses may be deposited on one side of the base 11 and the other two deposited on the other side thereof. For example, the common glow cathode bus 76 is illustrated in FIG. 5 as being deposited on the bottom side of the base member 11 and the first transfer electrode bus 78 is also illustrated as deposited on the bottom side of the base 11. The second transfer electrode bus 88 is shown as deposited on the upper side of the base member 11. Each of the printed circuit buses, such as the bus 76, includes suitable printed circuit extensions, such as the extension 76a, which connect the bus 76 with the respective glow cathode pins. In a similar manner the bus 78 is connected to the first transfer electrodes through the printed circuit portions 78a and the bus 88 is connected to the second transfer electrode pins through the portions 88a. In this connection it will be understood that these printed circuit connections are first formed, pressed or deposited on the base member 11 and the pins are then inserted into corresponding holes in the base member 11, after which all of the pins may be dip soldered to the printed circuit wiring in one operation for each side of the base member 11.

In FIG. 6 and 7 there is shown an alternative embodiment of the invention wherein a common anode is employed for both the hours and minutes rings. More particularly, the anode 160 in the form of an edge mounted circular band is employed as the common anode for both the hours ring of glow cathodes and transfer electrodes and the minutes ring of glow cathodes and transfer electrodes. The common anode 160 is connected to the B+ conductor 72 (FIG. 3) through a suitable load resistor such as the resistor 145 and all other connections are made to the glow cathodes and transfer electrodes in the hours and minutes rings in a manner identical to that shown in FIG. 3. In FIGS. 6 and 7 a printed circuit type of connection to the glow cathodes and transfer electrodes has been illustrated in a manner similar to that described above in connection with FIG. 5 and corresponding numerals have been given in FIGS. 6 and 7 for the respective buses which are employed to interconnect the glow cathodes and transfer electrodes in each of these rings. However, it will be understood that the common anode 160 replaces both the disc anode 20 and the anode ring 30 in the embodiments of FIGS. 1, 2 and 3. The value of the common load resistor connected to the anode 160 and the spacing between each set of glow cathodes and the common anode 160 is so chosen that one glow cathode of each ring may be simultaneously energized. Accordingly, glow discharges are sequentially produced on each ring of cathodes at the desired rate to provide minutes and hours displays. Such an arrangement has the advantage of being simpler and less expensive to manufacture. If desired, the outermost rings such as the rings 41 and 51 of FIG. 1 may be eliminated and the required control pulses occurring at one minute intervals may be derived from a separate electronic counter of the type described in more detail hereinafter in connection with FIG. 10.

In the electrical circuit arrangement of FIG. 3 a relatively simple integrating circuit is employed to provide two separate transfer pulses from the single control pulse derived from the alternating current supply or the preceding ring, these two transfer pulses being sequentially impressed upon the respective transfer buses of the glow discharge ring to effect glow transfer in the manner described heretofore. In some instances it is desirable to provide essentially square wave pulses for the transfer or guide electrodes and to insure that the second transfer pulse starts coincident with the trailing edge of the first transfer pulse. In FIG. 4 of the drawings there is shown an alternative electrical circuit arrangement which may be employed in conjunction with the combined counting and indicator device of FIGS. 1 and 2 to provide the above described type of glow discharge electronic clock display. In FIG. 4 circuit components and physical elements which are identical to those described heretofore in connection with FIGS. 1 to 3, inclusive, have been given the same reference numerals. Referring to FIG. 4, only a fragment of each of the four glow discharge rings together with the associated anodes has been shown in this figure, it being understood that the identified transfer buses and glow cathode buses are connected to all of the respective cathodes or electrodes in the above described concentric rings, with the exception of the twelve o'clock glow cathode in each ring which is connected in the manner shown in FIG. 4. Referring first to the outermost ring, the negative control pulses developed across the rectifier 83 are supplied to a blocking oscillator 200 which functions to produce a positive pulse of relatively short duration in response to each control pulse, as will be readily understood by those skilled in the art. The blocking oscillator 200 may conveniently be energized from the power supply 71. The narrow pulses produced by the blocking oscillator 200 are coupled through a condenser 205 to a voltage divider comprising the resistors 206 and 207.

In order to provide successive square wave pulses for the transfer electrodes of the outermost ring there is provided a double triode switching tube indicated generally at 210 and the square wave pulse which appears across the resistor 207 is directly connected to the grid of the lefthand triode section of the tube 210. The full amplitude pulse developed across the resistors 206 and 207 is also coupled through a resistor 211 to the grid of the righthand section of the tube 210, this grid also being connected to ground through the series combination of a resistor 212 and a condenser 213. The cathodes of the two sections of the tube 210 are connected together and to the junction point between the resistors 215 and 216, these resistors forming together with a resistor 217 a voltage divider which is connected between the conductor 72 and ground, the values of the resistors 217, 215 and 216 being so chosen that the voltage developed across the resistor 216 is approximately seven volts positive with respect to ground. The anode of the lefthand section of the tube 210 is directly connected to the first transfer bus 78 of the outermost glow discharge ring and the anode of the righthand section of the tube 210 is connected to the other transfer bus 88 of this ring. The common anode 50 is connected to the conductor 72 through an anode load resistor 75, as in FIG. 3. Since a substantial capacitance exists between the common anode 50 and the first and second groups of transfer electrodes 52 and 53, the B+ voltage for the two sections of the tube 210 is obtained through this anode to transfer electrode capacity, as will be readily understood by those skilled in the art. In addition, the anode of the lefthand section of the tube 210 is coupled through a small condenser 220 to the control grid of the righthand section of the tube 210. The plate resistance of the tube 210 may be varied by adjustment of the bias applied to this tube so that the proper operating potentials for the transfer electrodes relative to the anode 50 and glow cathode 51 may be achieved.

When the positive pulse produced by the blocking oscillator 200 is applied to the control grid of the lefthand triode section of the tube 210 through the voltage divider 206 and 207, a negative going pulse, which is essentially flat topped is produced at the anode of the lefthand triode section. As a result, the transfer bus 78 is driven negative by an amount such that transfer is effected to one of the guide or transfer electrodes 52a, 52b, etc., in the manner described in detail heretofore. The negative pulse produced at the anode of the lefthand triode section is coupled through the condenser 220 to the control grid of the righthand triode section of the tube 210 and functions to hold the righthand triode section non-conducting during the period of the negative pulse appearing at the anode of the lefthand triode section. At the same time the positive pulse coupled through the condenser 205 is applied through a time delay network consisting of the resistors 211 and 212 and the condenser 213 to the control grid of the righthand triode section. Accordingly, the righthand triode section is held non-conductive only so long as a negative pulse is transmitted through the condenser 220. By proper choice of circuit values of the time delay network 211, 212 and 213 and the time constant involving the condenser 220, the righthand triode section may be rendered conductive immediately following the pulse produced at the anode of the lefthand triode section with the result that a corresponding negative pulse is immediately produced at the anode of the righthand triode section. Since the anode of the righthand triode section is connected to the transfer bus 88, the glow discharge is then shifted to the corresponding one of the guide or transfer electrodes 53a, 53b, etc., as described in detail heretofore. Accordingly, for each positive pulse supplied by the blocking of the oscillator 200 a pair of substantially flat topped square wave pulses are applied in rapid succession to the transfer buses 78 and 88 associated with the outermost discharge ring.

The glow cathode 51a which is positioned at the twelve o'clock position in the outermost ring is not connected to the common glow cathode bus 76 but instead is connected through an output resistor 225 to this bus. In this connection it will be noted that the glow cathode bus 76 is connected to the junction between the resistors 217 and 215, the values of these resistors and the resistor 216 being so chosen that a voltage of approximately 62 volts positive with respect to ground is produced at this junction. However, attention is directed to the fact that the transfer buses 78 and 88, to which the respective groups of transfer electrodes are connected are operated at somewhat higher voltages due to the B+ impressed on the anodes of the two sections of the tube 210 through the above described capacity coupling from the common anode 50. Accordingly, the glow cathodes 51 are operated at a bias level somewhat less than the bias on the adjacent transfer electrodes even though the glow cathodes are connected to the plus sixty two volt point on the voltage divider 217, 215 and 216.

When the glow cathode 51a is energized once during each traversal of the outermost ring, a positive pulse is produced across the resistor 225 which is coupled through a condenser 226 to the pulse input of a similar switching circuit associated with the seconds glow discharge ring, this switching circuit including the double triode tube 230. The switching circuit including the tube 230 functions in a manner identical to that described above in connection with the switching circuit associated with the outermost ring to produce successive negative transfer pulses at the anodes of the lefthand and righthand sections of the tube 230, respectively, in response to a single positive pulse impressed upon the input voltage divider 231 and 232. Accordingly, the sequential energization of the glow cathodes 41 in the seconds glow discharge ring is effected in a manner identical to that described above in connection with FIG. 3.

When the glow cathode 41a, which is positioned at the twelve o'clock position in the seconds ring, is energized a positive pulse is produced across the output resistor 235 which is connected between this glow cathode and the 62 volt bias point on the voltage dividers 236, 237 and 238, this positive pulse being coupled through the condenser 240 to the input voltage divider 241 and 242 of a third switching circuit provided for the minutes ring, which includes a double triode tube 243. The tube 243 functions in a manner identical to that described above in connection with the tube 210 to supply successive transfer pulses to the buses 120 and 123 associated with the two groups of transfer electrodes in the minutes glow discharge ring so that the glow cathodes 31 in this ring are sequentially energized in the manner described in detail heretofore in connection with FIG. 3.

The glow cathode 31a is connected to the 62 volt bias point on the voltage divider 245, 246 and 247 through an output resistor 248 so that a positive voltage is developed across the resistor 248 each time the glow cathode 31a is energized, i.e., once every hour. Accordingly, a positive pulse of substantially one minute duration which occurs every hour is produced across the resistor 248 and is coupled through a condenser 249 to the input voltage divider 250 and 251 of the hours switching circuit which includes the switching tube 252. The anode of the lefthand section of the tube 252 is connected to the hours transfer bus 140 and the anode of the righthand section of the tube 252 is connected to the transfer bus 143. Accordingly, for each input pulse applied to the hours switching circuit a pair of transfer pulses of square wave shape are successively applied to the transfer buses 140 and 143 so as to effect sequential energization of the glow cathodes 22 in the hours glow discharge ring.

In order to set the hours and minutes rings to the desired hours and minutes indications, the minutes set switch 260 and the hours set switch 261 are provided in FIG. 4. When the switch 260 is closed the control pulses which are produced across the output resistor 225 at one second intervals are coupled to the input voltage divider 241, 243 of the minutes switching circuit so that the glow cathodes 31 in the minutes ring are sequentially energized at the rate of one every second. In a similar manner when the switch 261 is depressed the control pulses developed across the resistor 225 are likewise supplied to the input voltage divider 250, 251 of the hours switching circuit so that the glow cathode 22 in the hours ring are seqentially energized at the rate of one cathode per second. The switches 260 and 261 are held closed only for the time required to move the glow discharge to the desired ones of the minutes and hours glow cathodes after which they are opened and the glow cathodes in the respective rings are thereafter sequentially energized in the normal manner, as described in detail heretofore in connection with FIG. 3.

In FIGS. 8 and 9 of the drawings an alternative embodiment of the present invention is shown wherein the hours, minutes and seconds glow discharge rings are contained in separate tube envelopes, the displays from these three counter tubes being correlated on a common viewing screen by means of an optical arrangement. Referring to these figures, the electronic clock disclosed therein comprises an hours counting tube 300, a minutes counting tube 301 and a seconds counting tube 302. The tubes 300, 301 and 302 are positioned within a housing indicated generally at 305, a transparent cover 306 being provided to enclose the upper end of the housing 305. The cover 306 is transparent but an annular opaque mask 307 is provided so that the counting tubes 301 and 302 are not themselves directly visible through the cover 306.

The counting tubes 300, 301, and 302 are all constructed in the manner of the conventional cold cathode discharge tube of the sequence discharge type wherein the glow cathodes and interspersed guide or transfer electrodes are mounted within a glass envelope, such as the envelope 310 of the tube 300 and connections to these glow cathodes and transfer electrodes are taken off through a suitable base member such as the base 311 of the tube 300. However, in order to provide as compact a unit as possible the axial length of the tube envelope 310 is held as short as possible commensurate with good manufacturing techniques. It will also be understood that the hours counting tube 300 will comprise a ring of twelve glow cathodes interspersed with pairs of guide or transfer electrodes for each glow cathode, as described above in connection with the embodiment of FIGS. 1 and 2. In a similar manner, the minutes counting tube 301 will comprise a ring of sixty glow cathodes interspersed with pairs of guide or transfer electrodes for each glow cathode and the seconds counting tube 302 will also comprise a ring of sixty glow cathodes interspersed with pairs of guide or transfer electrodes for each glow cathode.

The hours counting tube 300 is mounted in the bottom of the housing 305 at the center thereof and the glow discharges which are produced on the hours glow cathode ring of the tube 300 are visible through the end of the envelope 310 and are viewed directly through the transparent cover 306 and a pair of partially transparent mirrors or reflecting members 312 and 313 which are positioned perpendicularly to each other and at 45 degree angles with respect to the central axis of the counting tube 300. The mirrors 312 and 313 are of the so-called one-way light transmission or partially transparent type so that light from the glow discharges produced on the glow cathodes in the counting tube 300 is transmitted upwardly through the members 312 and 313 without reflection with the result that these glow discharges can be viewed directly through the transparent cover 306.

As in the embodiment of FIGS. 1 and 2, the diameter of the hours glow discharge ring is chosen to be the smallest of the three rings, the diameter of this hours ring being indicated by the dotted lines 315 and 316. Thus, light issuing along the dotted line 315 from the tube 300, i.e., a glow discharge at the nine o'clock position, would be transmitted upwardly through the lefthand portions of the members 312 and 313 along the line 315. In a similar manner a glow discharge produced at the three o'clock position of the tube 300 would proceed along the line 316 through the members 312 and 313 and be viewed at this corresponding position through the cover 306.

The minutes counting tube 301 is positioned above and to the right of the hours counting tube 300 with the longitudinal axis of the tube 301 positioned horizontally, the boundaries of the glow discharge ring in the tube 301 being indicated by the dotted lines 320 and 321. The minutes counting tube 301 is so oriented that light from a glow discharge at the nine o'clock position of the minutes glow cathode ring will fall on a circle of slightly larger diameter than the hours minutes ring when viewed through the cover 306. Thus, light from the glow cathode of the minutes ring which is positioned at the nine o'clock position will issue from the tube 301 along the line 320, will pass through the upper portion of the mirror 312 without reflection and will then be reflected upwardly when it strikes the upper portion of the mirror 313. In a similar manner light issuing from the glow cathode at the three o'clock position of the tube 301 will issue along the line 321 and will be reflected by the bottom portion of the mirror 313 and will pass upwardly through the upper portion of the mirror 312, as is best illustrated in FIG. 9 of the drawings.

The seconds counting tube 302 is positioned above and to the left of the hours counting tube 300 with the longitudinal axis thereof horizontal. The tube 302 is so oriented and correlated with respect to the reflecting mirrors 312 and 313 that the glow discharges produced by the tube 302 are visible in a circle of somewhat larger diameter than the minutes ring through the transparent cover 306. Thus, light from a glow cathode at the nine o'clock position in the tube 302 will issue along the dotted line 325 of FIG. 9, be reflected upwardly by the bottom portion of the mirror 312 and pass directly through the upper portion of the mirror 313 and be viewed through the cover 306. In a similar manner light from the glow cathode at the three o'clock position of the tube 302 will issue through the end wall of the tube envelope along the line 326, pass directly through the upper portion of the mirror 313 and be reflected by the upper portion of the mirror 312 so that it is directed outwardly through the cover 306.

It will be understood that the minutes and seconds counting tubes 301 and 302 may be of somewhat larger size than the hours counting tube 300 due to the fact that the counting tubes 301 and 302 have a much larger number of glow cathodes therein. However, the position of the counting tubes 301 and 302 and the size of their respective discharge rings as viewed through the cover 306 may be varied by suitable optical focusing arrangements (not shown) so that the three glow discharges are superimposed as concentric rings of slightly different diameters as illustrated in FIGS. 8 and 9. With such an arrangement a single set of indicia, which may be suitably inscribed or otherwise provided on the cover 306, as shown in FIG. 8, may be used to facilitate the determination of time with reference to all three of the glow discharge rings. On the other hand, such optical focusing arrangements may be omitted if desired, in which case the diameters of the minutes and seconds rings will be substantially larger than the diameter of the hours ring. In the alternative, the spacing between the glow cathodes in the hours counting tubes may be made as large as possible and the spacing between the glow cathodes and the minutes and seconds counting tubes 301, 302 may be made as small as possible so as to provide glow discharge rings of comparable diameter, as discussed above in connection with FIGS. 1, 2 and 3.

Figure 10:
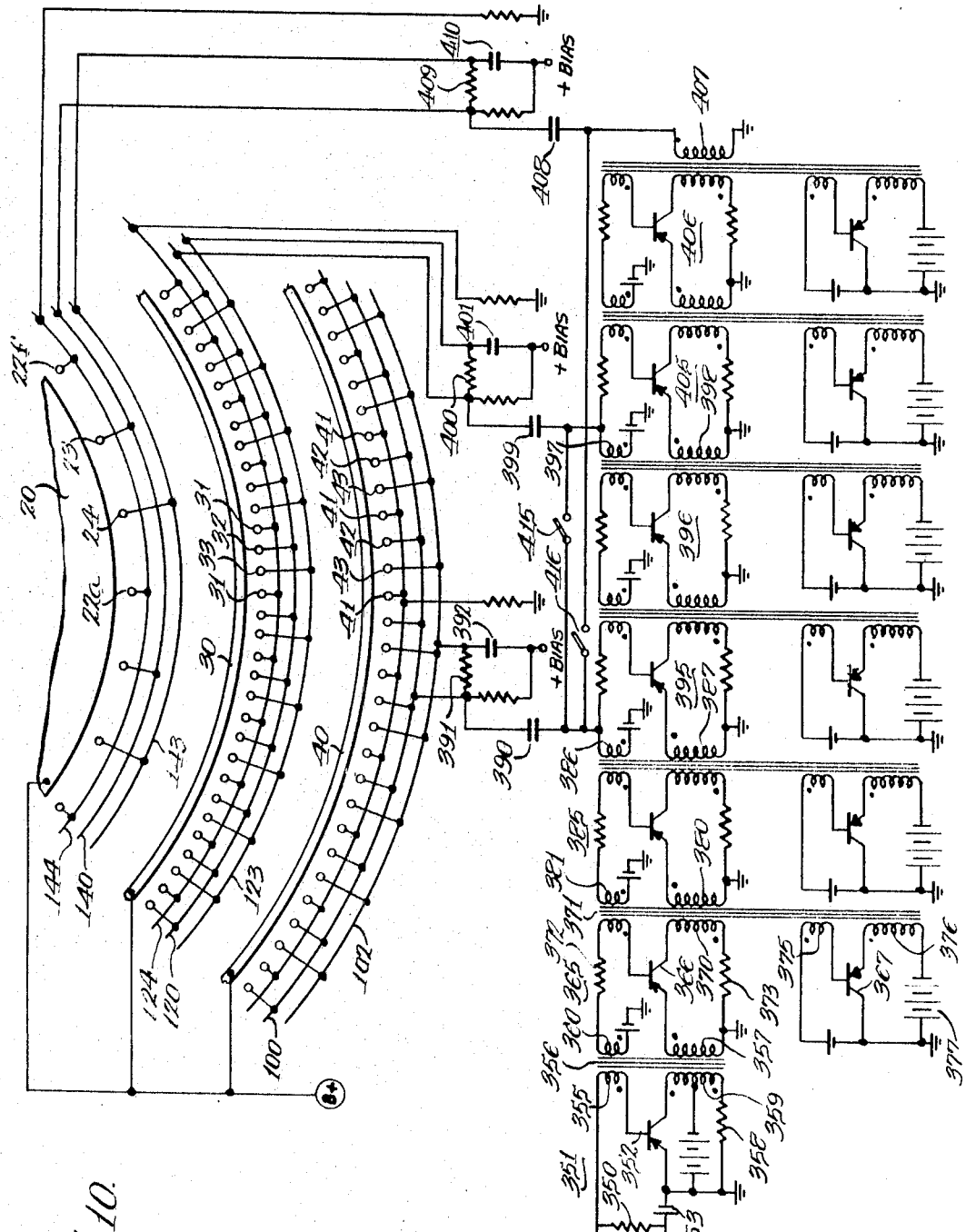
FIG. 10 is a schematic diagram of a further alternative embodiment of the invention wherein separate electronic facilities are employed to develop control pulses for the display rings of the electronic clock.

In FIG. 10 of the drawings there is shown an alternative embodiment of the invention wherein separate electronic counter facilities are provided to establish the necessary control pulses for the seconds, minutes and hours glow discharge rings, these counting facilities being independent of the glow discharge display device itself. Referring to this figure, there is illustrated therein an electronic counting arrangement which employs magnetic cores and transistor circuitry so that an extremely simple and compact pulse counting arrangement is provided. More particularly, negative control pulses occurring at the rate of 60 per second, which may be derived from the 60 cycle power supply by means of the saturating transformer 74 and rectifier arrangement shown in FIG. 3, are impressed upon an input resistor 350 of a pulse generator stage 351 which includes a transistor indicated generally at 352. This pulse generator is employed to provide an output pulse of definite volt-second area when triggered by an input pulse of random size or shape, the output pulses from this pulse generator being employed to trigger the first counting stage. With no pulse applied across the input resistor 350 the battery 353 holds the transistor 352 non-conducting. However, when a negative input pulse of an amplitude greater than the potential of the battery 353 is applied to the resistor 350 the transistor 352 is rendered conductive and acts as a closed switch so that current flows through the winding 355 on the core 356 with the result that the core 356 is driven to saturation. During this increase in flux a rectangular pulse of voltage is induced in the output winding 357 on the core 356 and when the transistor 352 stops conducting the current through the resistor 358 and the winding 359 functions to reset the core 356 to its original negative saturation point. When this reset is completed the generator 351 is again ready to produce another output pulse of the same volt-second area upon being triggered by another input pulse. An output pulse of the opposite polarity is also developed on a second output winding 360 on the core 356.

Considering now the first counting stage 365, this stage is employed to divide the input pulses by a factor of ten and includes a main transistor 366 and a rest transistor 367. When a negative pulse is produced across the winding 360 the transistor 366 is rendered conductive with the result that the positive pulse appearing across the winding 357 is supplied to a winding 370 on the first counting stage core 371 so that the flux level in this core is raised one step from the negative saturation point toward the positive saturation point. The turns ratios and sizes of the resistors 372 and 373 are so chosen that it will require ten input pulses from the generator 351 to drive the core 371 to its positive saturation point. When this occurs a large negative pulse is induced in the windings associated with the core 371 which includes the input winding 375 for the reset transistor 367 and a reset output winding 376 which is connected in circuit with the transistor 367 and a battery 377. The reset pulse thus produced in the core 371 functions to render the reset transistor 367 conductive so that a large pulse of current flows in the winding 376 and functions to drive the saturation level of the core 371 back to its original negative state. At this point the transistor 367 becomes non-conductive and the stage 365 waits for the next input pulse.

When this large pulse of current flows in the core 371 output pulses are also produced on the windings 380 and 381 of the core 371, these latter windings forming the input windings for the next counting stage 385. However, the counting stage 385 is arranged to go from negative to positive saturation levels with only six input pulses so that a division by a factor of 6 is achieved. This division by a factor of 6 is accomplished by the proper choice of the resistors and turns ratios of the windings in the second counting stage 385, as will be readily understood by those skilled in the art. Accordingly, there is produced in the output windings 386 and 387 pulses which occur at 1/60 of the rate of the pulses supplied to the input of the first counting stage 365. The negative pulses produced across the winding 386 are coupled through a condenser 390 to the first transfer bus 100 of the seconds glow discharge ring, it being understood that the outermost glow discharge ring shown in FIGS. 1 to 3, inclusive, is not required in the embodiment of FIG. 10 since the function of counting by a factor of 60 is achieved through the counting stages 365 and 385. The pulses applied to the bus 100 are also applied through a time delay network which includes the resistor 391 and the condenser 392 to the second transfer bus 102 in the seconds glow discharge ring. Accordingly, the glow discharge is moved in stepwise fashion from one of the glow cathodes 41 to another in response to the control pulses produced by the counting stage 385 and at a rate of one step per second. In this connection it will be understood that the alternative transfer bus switching arrangement shown in FIG. 4 may also be employed in the embodiment of FIG. 10 if desired, in which case the pulses coupled through the condenser 390 would be applied to a switching tube circuit similar to the circuit embodying the tube 210 in the circuit shown in FIG. 4.

In order to divide by another factor of 60 so that control pulses are provided at a rate of one pulse every minute, there is also provided a counting stage 395, which functions to divide the pulses produced across the windings 386 and 387 by a factor of 10 and a fourth counting stage 396 which functions to produce output pulses across the windings 397 and 398 thereof which are divided by a further factor of six. The pulses produced across the winding 397, which occur at the rate of one pulse every minute, are coupled through a condenser 399 to the minutes transfer bus 120 and by means of the time delay network 400 and 401 to the minutes transfer bus 123.

In order to provide control pulses for the hours glow discharge ring a further counting stage 405 is provided, which divides the pulses produced across the winding 397 and 398 by a factor of 10, and a final counting stage 406 which divides the pulses by a further factor of six so that pulses are produced across the output winding 407 of the final counting stage 406 at the rate of one pulse every hour. These latter pulses are coupled through a condenser 408 to the hours transfer bus 140 and through a time delay network 409 and 410 to the transfer bus 143. In this connection it will be understood that suitable switching tube circuits may be employed with each of the minutes and hours rings in the manner shown in FIG. 4 if desired, these switching circuits taking the place of the time delay networks 400, 401 and 409, 410.

In order to set the minutes and hours rings to any desired time indication a first push button switch 415 is connected between the winding 386 and the winding 397 so that the seconds pulses supplied through the condenser 390 to the seconds ring are also supplied through the condenser 399 to the minutes ring when the switch 415 is closed. In the same manner an hours setting switch 416 is provided which supplies the seconds pulses to the condenser 408 so that the glow discharges in the hours ring may be sequentially stepped around the ring at the rate of one each second in the manner described heretofore in connection with FIG. 3.

While the electronic counting stages in the embodiment of FIG. 10 has been illustrated as employing magnetic cores and transistor circuitry, it will be understood that any other suitable electronic counting arrangement may be employed. For example, other types of transistor or vacuum tube circuits, such as bistable multivibrators, flip-flop circuits and the like, may be employed together with the necessary logic circuits to provide the required pulse division by factors of 60. For example, a set of three beam switching tubes may be employed to divide the input pulse rate by factors of five, four and three, respectively, a coincidence circuit being employed to develop an output pulse divided by a factor of 60 from the outputs of these three beam switching tubes. Other electronic counting arrangements may equally well be employed, as will be readily understood by those skilled in the art.

While the invention has been described in connection with particular embodiments of the invention, it will be understood that various modifications may be made thereon which are within the true spirit and scope of the invention as defined in the appended claims.

I claim:

1. An electronic clock, comprising a counter array which includes a plurality of counters connected in series with one another, said series connected counter array having an input, display indicator means coupled to the counters in said array and arranged to provide a time indication, a primary pulse source coupled to said input for stepping said counters and for operating said display indicators at a predetermined rate and in a predetermined sequence, means for developing secondary pulses having a repetition rate in excess of said primary pulse source and switch means for applying said secondary pulses to the input of said series connected counters, thereby to permit the time indication effected by said display indicators to be readily set to a desired indication.

2. In an electronic clock, the combination of, a minutes counter comprising a plurality of counting stages connected in series with one another, said minutes counter having an input, display indicator means coupled to the counting stages in said minutes counter and arranged to provide a time indication visible to an observer, a primary pulse source coupled to said input of said minutes counter for stepping said counter and for operating said display indicators at a predetermined rate and in a predetermined sequence, means for developing time setting pulses having a repetition rate which is higher than that of said primary pulse source, and means for selectively supplying said time setting pulses to said input, thereby to permit the time indication effected by said display indicator means to be readily set to a desired indication.

3. An electronic clock, comprising pulse counting means including a plurality of interconnected counting stages and having an input, display indicator means coupled to the counting stages of said counting means and arranged to provide a time indication, a primary pulse source coupled to said input for stepping said counting means and for operating said display indicator means at a predetermined rate, means for developing time setting pulses having a repetition rate which is higher than that of said primary pulse source, and means for selectively supplying said time setting pulses to said counting means, thereby to permit the time indication effected by said display indicator means to be readily set to a desired indication.

4. An electronic clock, comprising pulse counting means including a plurality of interconnected counting stages and having an input, display indicator means coupled to the counting stages of said counting means and arranged to provide both hours and minutes time indications, a primary pulse source coupled to said input for stepping said counting means and for operating said display indicator means at a predetermined rate, means for developing time setting pulses having a repetition rate which is higher than that of said primary pulse source, and means for selectively supplying said time setting pulse to said counting means, thereby to permit both the hours and minutes time indications effected by said display indicator means to be readily set to a desired indication.

5. An electronic clock, comprising pulse counting means including a plurality of interconnected counting stages and having an input, display indicator means coupled to the counting stages of said counting means and arranged to provide a time indication, a primary pulse source coupled to said input for stepping said counting means and for operating said display indicator means at a predetermined rate, first means for supplying time setting pulses having a repetition rate which is higher than said primary pulse source to said counting means, thereby to coarse-set the time indication effected by said display indicator means approximately to a desired indication, and second means for supplying time setting pulses having a repetition rate which is higher than said primary pulse source to said counting means, thereby to fine-set the time indication effected by said display indicator means precisely to a desired indication.

6. An electronic clock, comprising pulse counting means including a plurality of interconnected counting stages and having an input, display indicator means coupled to the counting stages of said counting means and arranged to provide both hours and minutes time indications, a primary pulse source coupled to said input for stepping said counting means and for operating said display indicator means at a predetermined rate, first means for supplying time setting pulses having a repetition rate which is higher than said primary pulse source to said counting means, thereby to set the hours indication effected by said display indicator means to a desired value, and second means for supplying time setting pulses having a repetition rate which is higher than said primary pulse source to said counting means, thereby to set the minutes indication effected by said display indicator means to a desired value.

7. An electronic clock, comprising pulse counting means including a plurality of interconnected counting stages and having an input, display indicator means coupled to the counting stages of said counting means and arranged to provide both hours and minutes time indications, a primary pulse source coupled to said input for stepping said counting means and for operating said display indicator means at a predetermined rate, means for developing time setting pulses having a repetition rate which is higher than that of said primary pulse source, first means for selectively applying said time setting pulses to said counting means to step the same so that the hours indication effected by said display indicator means may be set to a desired value and at a rate corresponding to said time setting pulses, and second means for selectively applying said time setting pulses to said counting means to step the same so that the minutes indication effected by said display indicator means may be set to a desired value and at a rate corresponding to said time setting pulses.

8. An electronic clock, comprising pulse counting means including a plurality of interconnected counting stages and having an input, display indicator means coupled to the counting stages of said counting means and arranged to provide both hours and minutes time indications, a primary pulse source coupled to said input for stepping said counting means and for operating said display indicator means at a predetermined rate, first means for selectively applying time setting pulses which have a repetition rate which is higher than that of said primary pulse source to said counting means to step the same so that the hours indication effected by said display indicator means may be set to a desired value at a rate determined by said time setting pulses, and second means for selectively applying time setting pulses which have a repetition rate which is higher than that of said primary pulse source to said counting means to step the same so that the minutes indication effected by said display indicator means may be set to a desired value at a rate determined by said time setting pulses.

9. In an electronic clock of the type comprising a plural stage pulse counting arrangement energized by a source of oscillations having a predetermined fixed frequency operative to actuate the stages of said counting arrangement at a predetermined rate and in a predetermined sequence and display indicator means controlled by the individual stages of said counting arrangement continuously to provide a time indication, the improvement which comprises a secondary source of oscillations having an output frequency higher than said predetermined frequency, and time setting means for selectively applying the output of said secondary source to said pulse counting arrangement to step the same so that the time indication effected by said display indicator means may be rapidly set to a desired indication.

10. An electronic clock comprising a counter array comprising a plurality of counters connected in series with one another, said series connected counter array having an input, the counters in said array having separate outputs respectively controlling display indicator means arranged to provide a time indication, a primary pulse source coupled to said input of said series connected counters for stepping said counters and for operating said display indicator means at a predetermined rate and in a predetermined sequence, a secondary source of pulses operative to produce pulses at a repetition rate in excess of said primary pulse source, and switch means for selectively disconnecting said primary pulse source from said input and for applying pulses from said secondary source to the input of said series connected counters thereby to permit the time indication effected by said display indicator means to be readily set to a desired indication.

11. An electronic clock comprising a counter array comprising a plurality of counters connected in series with one another, said series connected counter array having an input, the counters in said array having separate outputs respectively energizing display indicators arranged to provide a time indication, a primary pulse source coupled to said input of said series connected counters for stepping said counters and for operating said display indicators at a predetermined rate and in a predetermined sequence, a secondary source of pulses operative to produce pulses at a repetition rate in excess of said primary pulse source, and switch means for selectively disconnecting said primary pulse source from said input and for applying pulses from said secondary source to the input of said series connected counters thereby to permit the time indication effected by said display indicators to be readily set to a desired indication.

12. An electronic clock comprising a counter array comprising a plurality of counters connected in series with one another, said series connected counter array having an input, the counters in said array having separate outputs respectively connected to display indicators arranged to provide a time indication, a primary pulse source coupled to said input of said series connected counters for stepping said counters and for operating said display indicators at a predetermined rate and in a predetermined sequence, a secondary source of pulses operative to produce pulses at a repetition rate in excess of said primary pulse source, and switch means for selectively disconnecting said primary pulse source from said input and for applying pulses from said secondary source to the input of said series connected counters thereby to permit the time indication effected by said display indicators to be readily set to a desired indication.

13. An electronic clock, comprising a gas filled housing, first pulse counting means positioned within said housing and arranged to produce an hour indicating spot of illumination which moves discontinuously twelve equal steps around a first circular path at the rate of one step for each pulse applied to said first pulse counting means, second pulse counting means positioned within said housing and arranged to produce a minute indicating spot of illumination which moves discontinuously in sixty equal steps around a second circular path at the rate of one step for each pulse applied to said second pulse counting means, said second circular path being concentric with said first circular path, means for applying first control pulses to said first counting means at intervals of one hour, means for applying second control pulses to said second counting means at intervals of one minute, means for developing hour setting pulses which occur at an abnormally high rate as compared with said first control pulses, hour indication setting means for applying said hour setting pulses to said first pulse counting means so that said hour indicating spot of illumination may be set to a desired hour indication, means for developing minute setting pulses which occur at an abnormally high rate as compared with said second control pulses, and minute indication setting means for applying said minute setting pulses to said second pulse counting means so that said minute indicating spot of illumination may be set to a desired minute indication.

14. An electronic clock, comprising a gas filled housing, first pulse counting means positioned within said housing and arranged to produce an hour indicating spot of illumination which moves discontinuously twelve equal steps around a first circular path at the rate of one step for each pulse applied to said first pulse counting means, second pulse counting means positioned within said housing and arranged to produce a minute indicating spot of illumination which moves discontinuously in sixty equal steps around a second circular path at the rate of one step for each pulse applied to said second pulse counting means, said second circular path being concentric with said first circular path, means for applying first control pulses to said first counting means at intervals of one hour, means for applying second control pulses to said second counting means at intervals of one minute, hour indication setting means for applying hour setting pulses to said first pulse counting means at intervals of one second so that said hour indicating spot of illumination may be quickly set to a desired hour indication, and minute indication setting means for applying minute setting pulses to said second pulse counting means so that at intervals of one second said minute indicating spot of illumination may be quickly set to a desired minute indication.

15. An electronic clock, comprising first pulse counting means arranged to produce an hour indicating spot of illumination which moves discontinuously twelve equal steps around a first circular path at the rate of one step for each pulse applied to said first pulse counting means, second pulse counting means arranged to produce a minute indicating spot of illumination which moves discontinuously in sixty equal steps around a second circular path at the rate of one step for each pulse applied to said second pulse counting means, said second circular path being concentric with said first circular path, means for applying first control pulses to said first counting means at intervals of one hour, means for applying second control pulses to said second counting means at intervals of one minute, hour indication setting means for applying hour setting pulses to said first pulse counting means at intervals of one second so that said hour indicating spot of illumination may be quickly set to a desired hour indication, and minute indication setting means for applying minute setting puses to said second pulse counting means at intervals of one second so that said minute indicating spot of illumination may be quickly set to a desired minute indication.

16. An electronic clock, comprising an evacuated housing having a window therein, first pulse counting means in said housing and arranged to produce an hour indicating spot of illumination viewable through said window which moves discontinuously in twelve equal steps around a first circular path at the rate of one step for each pulse applied to said first pulse counting means, second pulse counting means in said housing and arranged to produce a minute indicating spot of illumination viewable through said window which moves discontinuously in sixty equal steps around a second circular path at the rate of one step for each pulse applied to said second pulse counting means, means for applying first control pulses to said second pulse counting means at intervals of one minute, means for deriving second control pulses from said second pulse counting means which recur at intervals of one hour, means for applying said second control pulses to said first pulse counting means, hour indication setting means for applying hour setting pulses to said first pulse counting means so that said hour indicating spot of illumination may be set to a desired hour indication, and minute indication setting means for applying minute setting pulses to said second pulse counting means so that said minute indication spot of illumination may be set to a desired minute indication.

17. In an electronic clock, comprising an evacuated housing having a window therein, first pulse counting means in said housing and arranged to produce an hour indicating spot of illumination viewable through said window which moves discontinuously in twelve equal steps around a first circular path at the rate of one step for each pulse applied to said first pulse counting means, second pulse counting means in said housing and arranged to produce a minute indicating spot of illumination viewable through said window which moves discontinuously in sixty equal steps around a second circular path at the rate of one step for each pulse applied to said second pulse counting means, third pulse counting means in said housing and arranged to produce a seconds indicating spot of illumination viewable through said window which moves discontinuously in sixty equal steps around a third circular path at the rate of one step for each pulse applied to said third pulse counting means, means for applying first control pulses to said third pulse counting means at intervals of one second, means for deriving second control pulses from said third pulse counting means which recur at intervals of one minute, means for applying said second control pulses to said second pulse counting means, means for deriving third control pulses from said second pulse counting means which recur at intervals of one hour, means for applying said third control pulses to said first pulse counting means, means for developing setting pulses which recur at intervals of one second, and means for selectively applying said setting pulses to said first and second pulse counting means so that said hour and minute indicating spots may be quickly set to desired hour and minute indications.

18. An electronic clock, comprising an evacuated housing having a window therein, first pulse counting means in said housing and arranged to produce an hour indicating spot of illumination viewable through said window which moves discontinuously in twelve equal steps around a first circular path at the rate of one step for each pulse applied to said first pulse counting means, second pulse counting means in said housing and arranged to produce a minute indicating spot of illumination viewable through said window which moves discontinuously in sixty equal steps around a second circular path at the rate of one step for each pulse applied to said second pulse counting means, third pulse counting means in said housing and arranged to produce a seconds indicating spot of illumination viewable through said window which moves discontinuously in sixty equal steps around a third circular path at the rate of one step for each pulse applied to said third pulse counting means, fourth pulse counting means in said housing and arranged to develop output pulses at the rate of one output pulse for every sixty input pulses applied thereto, means for deriving input pulses from a sixty cycle alternating current supply which recur at intervals of one-sixtieth of a second and applying said input pulses to said fourth pulse counting means, means for applying output pulses from said fourth pulse counting means to said third pulse counting means, means for deriving first control pulses from said third pulse counting means which recur at intervals of one minute, means for applying said first control pulses to said second pulse counting means, means for deriving second control pulses from said second pulse counting means which recur at intervals of one hour, and means for applying said second control pulses to said first pulse counting means.

19. An electronic clock, comprising a gas-filled housing, a first series of glow cathodes arranged at spaced points in a first configuration within said housing, a first series of glow transfer electrodes positioned adjacent glow cathodes of said first series and connected to a first common input circuit, a second series of glow cathodes arranged at spaced points in a second configuration within said housing, a second series of glow transfer electrodes positioned adjacent glow cathodes of said second series and connected to a different common input circuit, means for developing a train of first control pulses having a repetition rate of one pulse per minute, means for continuously applying said first control pulses to said first input circuit, means for producing a glow discharge adjacent one of the glow cathodes in said first series and for transferring the same through the gas filling of said housing to the next glow cathode in the series in response to said first control pulses, means for deriving from one of the glow cathodes in said first series a train of second control pulses having a repetition rate of one pulse per hour, means for continuously applying said second control pulses to said different common input circuit, and means for producing a glow discharge adjacent one of the glow cathodes in said second series and for transferring the same through the gas filling of said housing to the next glow cathode in the series in response to said second control pulses.

20. An electronic clock, comprising a gas-filled housing, a first series of glow cathodes arranged at spaced points in a first configuration within said housing, a first series of glow transfer electrodes positioned adjacent glow cathodes of said first series and connected to a first common input circuit, a first anode in said housing and positioned adjacent said first series of glow cathodes, a second series of glow cathodes arranged at spaced points in a second configuration within said housing, a second series of glow transfer electrodes positioned adjacent glow cathodes of said second series and connected to a different common input circuit, a second anode in said housing and positioned adjacent said second series of glow cathodes, means for developing a train of first control pulses having a repetition rate of one pulse per minute, means for continuously applying said first control pulses to said first input circuit, means including said first anode for producing a glow discharge adjacent one of the glow cathodes in said first series and for transferring the same through the gas filling of said housing to the next glow cathode in the series in response to said first control pulses, means for deriving from one of the glow cathodes in said first series a train of second control pulses having a repetition rate of one pulse per hour, means for continuously applying said second control pulses to said different common input circuit, and means including said second anode for producing a glow discharge adjacent one of the glow cathodes in said second series and for transferring the same through the gas filling of said housing to the next glow cathode in the series in response to said second control pulses.

21. An electronic clock, comprising a gas-filled housing, a first series of glow cathodes arranged at spaced points in a first configuration within said housing, a first series of glow transfer electrodes positioned adjacent glow cathodes of said first series and connected to a first common input circuit, a second series of glow cathodes arranged at spaced points in a second configuration within said housing, a second series of glow transfer electrodes positioned adjacent glow cathodes of said second series and connected to a second common input circuit, means for developing a train of first control pulses having a repetition rate of one pulse per minute, means for applying said first control pulses to said first input circuit, means for producing a glow discharge adjacent one of the glow cathodes in said first series and for transferring the same through the gas filling of said housing to the next glow cathode in the series in response to said first control pulses, means for developing a train of second control pulses having a repetition rate of one pulse per hour, means for applying said second control pulses to said second common input circuit, means for producing a glow discharge adjacent one of the glow cathodes in said second series and for transferring the same through the gas filling of said housing to the next glow cathode in the series in response to said second control pulses, means for developing third control pulses having a repetition rate which is substantially higher than said first control pulses, and switch means adapted when closed to supply said third control pulses to said first input circuit so that glow discharge is transferred along said first series of glow cathodes at the rate of one cathode for each of said third control pulses as long as said switch means remains closed, whereby a desired minutes setting may be rapidly obtained.

22. An electronic clock as claimed in claim 21, which includes further switch means adapted when closed to supply said third control pulses to said second input circuit so that glow discharge is transferred along said second series of glow cathodes at the rate of one cathode for each of said third control pulses as long as said further switch means is closed, whereby a desired hours setting may be rapidly obtained.

23. An electronic clock as claimed in claim 19, wherein there is provided a single anode common to both said first and second series of glow cathodes and said first and second series of glow transfer electrodes, and means for energizing said common anode, whereby said glow cathode discharges representing hours and minutes indications may be simultaneously produced.

24. An electronic clock as claimed in claim 19, wherein there is also provided within said housing a series of sixty glow cathodes and associated glow transfer electrodes, an alternating current supply, means for deriving control pulses from said supply having a repetition rate of sixty pulses per second and applying the same to said associated glow transfer electrodes, means connected to one of said sixty glow cathodes for deriving control pulses occurring at the rate of one pulse per second, and means including said derived control pulses for developing said train of first control pulses.

25. An electronic clock as claimed in claim 19, wherein there is provided within said housing two additional series of sixty glow cathodes each and glow transfer electrodes associated therewith, an alternating current supply, means for deriving pulses from said supply having a repetition rate of sixty pulses per second, means for applying said derived pulses to the glow transfer electrodes of one of said associated series, means connected to one of the glow cathodes of said one additional series for deriving control pulses occurring at the rate of one pulse per second, means for applying said last named pulses to the glow transfer electrodes of the other of said associated series, and means connected to one of the glow cathodes of said other additional series for developing said train of first control pulses.

26. An electronic clock as set forth in claim 19, wherein said gas-filled housing is provided with a transparent window therein, said glow cathodes of said first series are arranged at spaced points in a first annular space within said housing and are viewable through said window, and the glow cathodes of said second series are arranged at spaced points in a second annular space within said housing and are viewable through said window, said second annular space being concentric with and of smaller radius than said first annular space.

27. An electronic clock as set forth in claim 20, wherein said gas-filled housing is provided with a transparent window therein, said glow cathodes of said first series are arranged at spaced points in a first annular space within said housing and are viewable through said window, and the glow cathodes of said second series are arranged at spaced points in a second annular space within said housing and are viewable through said window, said second annular space being concentric with and of smaller radius than said first annular space.

28. An electronic clock as set forth in claim 19, wherein a third series of glow transfer electrodes is positioned adjacent the glow cathodes of said first series which glow transfer electrodes are connected to a third common input circuit, means for applying control pulses to said third input circuit which are delayed with respect to said first control pulses, a fourth series of glow transfer electrodes are positioned adjacent the glow cathodes of said second series and are connected to a fourth common input circuit, and means for applying control pulses to said fourth input circuit which are delayed with respect to said second control pulses.

No references cited.

ARTHUR GAUSS, Primary Examiner

STANLEY D. MILLER, Assistant Examiner

U.S. Cl. X.R.

58—24, 26, 35, 50; 313—109.5, 210